United States Patent
Udaya et al.

(10) Patent No.: US 12,063,266 B2
(45) Date of Patent: Aug. 13, 2024

(54) OBJECT-BASED TRANSPORTATION ACROSS TENANTS

(71) Applicant: SAP SE, Walldorf (DE)

(72) Inventors: Sahana Durgam Udaya, Bangalore (IN); Pranav Kumar, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/962,309

(22) Filed: Oct. 7, 2022

(65) Prior Publication Data
US 2024/0121292 A1 Apr. 11, 2024

(51) Int. Cl.
*H04L 67/10* (2022.01)
*G06F 16/23* (2019.01)

(52) U.S. Cl.
CPC .......... *H04L 67/10* (2013.01); *G06F 16/2365* (2019.01)

(58) Field of Classification Search
CPC .............................. H04L 67/10; G06F 16/2365
See application file for complete search history.

(56) References Cited

U.S. PATENT DOCUMENTS

| | | | |
|---|---|---|---|
| 8,577,835 B2 | 11/2013 | Doshi et al. | |
| 9,971,529 B1 | 5/2018 | LeCrone | |
| 10,157,196 B2 | 12/2018 | Baker et al. | |
| 10,768,920 B2* | 9/2020 | Fontoura | G06F 8/65 |
| 11,366,842 B1 | 6/2022 | Swaminathan | |
| 2011/0302133 A1 | 12/2011 | Kuruganti et al. | |
| 2012/0254111 A1 | 10/2012 | Carmichael | |
| 2016/0196324 A1* | 7/2016 | Haviv | G06F 3/0685 |
| | | | 707/649 |
| 2019/0129986 A1* | 5/2019 | Birn | G06F 16/217 |
| 2021/0099380 A1 | 4/2021 | Suryanarayana | |
| 2021/0258267 A1 | 8/2021 | Vishwakarma | |
| 2021/0320968 A1 | 10/2021 | Chu | |
| 2022/0012134 A1 | 1/2022 | Chatterjee | |
| 2022/0121629 A1* | 4/2022 | Nair | G06F 16/211 |
| 2022/0201073 A1 | 6/2022 | Mallikarjuna Durga Lokanath | |
| 2022/0263897 A1 | 8/2022 | Karr | |

OTHER PUBLICATIONS

European Patent Office, Extended European Search Report, issued in EU Application No. 23189349.6-1203, dated Jan. 5, 2024, 10 pgs.

* cited by examiner

*Primary Examiner* — El Hadji M Sall
(74) *Attorney, Agent, or Firm* — Fountainhead Law Group, PC (57) ABSTRACT

Object-based transportation between tenants may provide advantages over persistence layer-based transportation on a cloud platform in situations where persistence layer storage space is limited. Object based transportation involves obtaining a selection from the target tenant application of a set of objects from the plurality of objects and determining objects identifiers for each of the selected set of objects. For each object in the selected set of objects, a request is sent to a source tenant. The requests includes the corresponding object identifier for that object. Corresponding object data is received from the source tenant. At least a portion of the corresponding object data is stored in a target tenant database. An existing object may be updated or a new object may be created.

20 Claims, 5 Drawing Sheets

OBJECT-BASED TRANSPORTATION ACROSS TENANTS

BACKGROUND

The present disclosure pertains to cloud applications and in particular to transportation of database objects for cloud applications.

Cloud platforms may provide analytics applications including tools that analyze data and provide insights on that data to use for planning and decision making. Analytics content including data models, visualizations of data, dashboards, etc. play a central role in enabling users to discover such insights. Hence, sharing of such analytics content across users may be advantageous. Cloud platforms may provide a persistence layer to store and manage packages of analytics content to enable sharing. The persistence layer refers to a file based storage that may be used to store contents of a package in the form of a file. However, cloud storage space may be limited (e.g., per tenant or per user), thereby limiting the ability of the analytic content packages to be shared. There is a need for improved techniques for transporting content packages between tenants.

The present disclosure addresses these issue and others, as further described below.

SUMMARY

Some embodiments provide a computer system. The computer system may comprise one or more processors. The computer system may comprise one or more machine-readable medium coupled to the one or more processors and storing computer program code comprising sets instructions executable by the one or more processors. The instructions may be executable by the one or more processors to provide a user interface to an application of a target tenant. The user interface may include a list of a plurality of objects shared by a source tenant. Each of the plurality of objects may be associated with an object identifier. The instructions may be further executable to obtain a selection from the target tenant application of a set of objects from the plurality of objects. The instructions may be further executable to determine objects identifiers for each of the selected set of objects. For each object in the selected set of objects, the instructions may be further executable to send a request to a source content management service of a source tenant, the request including the corresponding object identifier for that object, receive corresponding object data from the source content management service, and store at least a portion of the corresponding object data in a target tenant database.

Some embodiments provide one or more non-transitory computer-readable medium storing computer program code comprising sets of instructions. The computer program code may include sets of instructions to provide a user interface to an application of a target tenant. The user interface may include a list of a plurality of objects shared by a source tenant. Each of the plurality of objects associated with an object identifier. The computer program code may further include instructions to obtain a selection from the target tenant application of a set of objects from the plurality of objects. The computer program code may further include instructions to determine objects identifiers for each of the selected set of objects. For each object in the selected set of objects, the computer program code may further include instructions to send a request to a source content management service of a source tenant, the request including the corresponding object identifier for that object, receive corresponding object data from the source content management service, and store at least a portion of the corresponding object data in a target tenant database.

Some embodiments provide a computer-implemented method. The method may include providing a user interface to an application of a target tenant. The user interface may include a list of a plurality of objects shared by a source tenant. Each of the plurality of objects associated with an object identifier. The method may also include obtaining a selection from the target tenant application of a set of objects from the plurality of objects. The method may also include determining objects identifiers for each of the selected set of objects. For each object in the selected set of objects, the method may also include sending a request to a source content management service of a source tenant, the request including the corresponding object identifier for that object, receiving corresponding object data from the source content management service, and storing at least a portion of the corresponding object data in a target tenant database.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software.

The embodiments can also be practiced in distributed computing environments where operations are performed by remote data processing devices or systems that are linked through one or more wired or wireless networks. As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

As mentioned above, cloud platforms may provide analytics applications including tools that analyze data and provide insights on that data to use for planning and decision making. Analytics content including data models, visualizations of data, dashboards, etc. play a central role in enabling users to discover such insights. Hence, sharing of such analytics content across users may be advantageous. Cloud platforms may provide a persistence layer to store and manage packages of analytics content to enable sharing. A persistence layer refers to a file based storage that may be used to store contents of package in the form of file. However, cloud storage space may be limited (e.g., per tenant or per user), thereby limiting the ability of the analytic content packages to be shared. There is a need for improved techniques for transporting content packages between tenants.

The present disclosure provides for object-based sharing and transportation across tenants, which is an improvement upon prior persistence layer-based sharing and transportation in many respects. With object-based transportation objects may be sent between tenant databases without using an intermediate persistence layer (e.g., of a cloud platform). The tenant databases each comprise rows and columns of data, as opposed to the persistence layer which does not store data in this format (it is not a database). Before providing details on the object-based transportation techniques, a description of analytics applications and the prior persistence layer-based techniques are described.

Analytics applications may enable users to create analytics content in the form of visualization dashboards (referred to as "stories"), data models, dimensions, connections, value-driver trees, etc. Users may wish to share such content with other users, even across tenants.

In a multi-tenant cloud computing platform, "tenants" refer to different entities having separate (isolated) data on the same platform (e.g., separate tenant databases on the same database system).

Persistence Layer-Based Transportation and Sharing

In persistence layer-based transportation and sharing, a cloud platform may allocate a certain amount of storage space to different tenants. The storage in the persistence layer may be used to share analytics content across tenants. For example, a user may create packages (e.g., sets) of analytics content to be stored in the persistence layer. A package may include details of each object (e.g., data object of analytics content) present in the package as well as dependency information between those objects. The package may also include package metadata or an overview that summaries the content details. For example, package metadata may include version information and a list of object information for each object including an object type, an object name, an object identifier, and an ancestor path.

Users may view a listing of available content packages, select packages, and import them for their analytics workflow. This may include public packages of analytics content (e.g., templates or demonstration content) or private content (e.g., packages privately shared by the creator).

In persistence layer-based sharing, a user may create a package and export (e.g., share) it to the persistence layer, and then other users may import the package from the persistence layer. To create and export a package a user may select an option in the cloud analytics application to create a new package or export a package. Then the user may select objects (e.g., a database artifact such as a dashboard/story artifact, data model, dimension, roles, folder, etc.). The user may provide information such as package name, description, details. The user may optionally share with destinations, selects industry, etc. The user may also review package summary prior. Then the user may initiate export of the package to create a new package in the persistence layer of the cloud storage system.

An example process for exporting a package to a persistence layer is described. The user may access the cloud platform using a web browser and initiate export of the package, for example. The browser may send package details to a content manager service, which may perform authorization checks. The content manager service may then get the selected object metadata bad object content from a service of the database where it is stored. The database service may return the object details to the content manager service, which may save the package metadata to a content manager database server, which may provide a response back to the content manager service. The content manager service may then save package metadata and package content to a persistency layer of the cloud platform (e.g., of the content manager database server). The persistence layer may send the content manager service an indication that the package was created and the content manager service may send the browser an indication that the package was created. By this information flow the user has exported a package of analytics content to the persistence layer such that it may be shared with other users.

In persistence layer-based sharing, a user may import a public package or a private package shared with them. To do this, the user may initiate the import workflow, select a package to be imported, optionally review a package summary, optionally update import preferences and object location as needed, and initiate the import of the package. For example, the user may initiate import of a package using a web browser accessing the cloud platform. The browser may send package details to the content manager service, which may perform authorization checks. The content manager service may get package metadata from the content manager database service, which provides it in a response. The content manager service may then get package content from the persistence layer, which provides it in a response. The content manager service may then send a request to the database service (e.g., the database service for the cloud application for this user, similar to the database service for the other user that created the package) to create an object using information from the package. The database service may create the object using the information from the package and send a response to the content manager service. The content manager service may then notify the browser that the package has been imported. Thus, a package created by one user may be imported and stored by another user, potentially across tenants.

However, as discussed above, using a persistence layer has some drawbacks. For example, there may be space limitations (e.g., each tenant may be limited to 300 MB, 500 MB, 1 TB, etc. of cloud storage space). Additional storage resources may potentially be available however storage resources are not infinite nor without cost. Accordingly, one of the drawbacks of sharing content to a persistence layer on a cloud platform includes users having the manage packages by deleting unwanted packages. Another drawback is that users need to determine which packages are unwanted using sort by date but without other smarter ways of determining unwanted packages. Another drawback is that users may fail to create new packages when their allocated storage does not have enough space, which may impact life cycle management and back/restore functionality. Another drawback is that the same object may be duplicated across packages, consuming cloud space and it is not possible to determine which all packages contain same objects. Another drawback is the tight coupling to persistence layer which may be disadvantageous where each hyperscaler has its own object store implementation, cost for usage, etc.

Another drawback of persistence-based sharing is that it may be difficult to update packages. In persistence-based sharing, creation and export are two steps of the process and importing is a third step. If an object is updated, the user might re-export each package that includes that object that this update can then be re-imported by the other user.

Object-Based Transportation and Sharing

The present disclosure provides object-based transportations and sharing of analytics content that avoids or mitigates some of the drawbacks of the persistence layer-based approach described above. Object-based transportation, described in further detail below, decouples transportation from persistence layer dependency, avoiding hitting the cloud storage limit issue. Object-based transportation allows users to take informed decision during object transport as it provides an overall preview of the objects and its status with respect to source vs target tenant. Transportation of objects across tenants may be used for any type of objects of analytics content (e.g., dashboard/story, data model, dimension, etc.).

In objected-based transportation, user selected objects are transported from the source to the target without using the persistence layer. Object-based transportation transports the object's current snapshot live across systems or across tenants. As an example, a Uniform Resource Locator (URL) of the source tenant may be input on the target tenant, which may populate a list of objects. The objects of the source tenant may be selected by a user. Then the target content management service may start a job to transport the selected object data from the source tenant via the source content management service. Then the target content management service provides the objects (received from the source content management service) to be created in the target tenant. Thus, the content consumer on the target tenant may pull objects from the content owner (the source tenant). The URL may be provided to the user of the target tenant in situations where trust is established.

Figure 1:
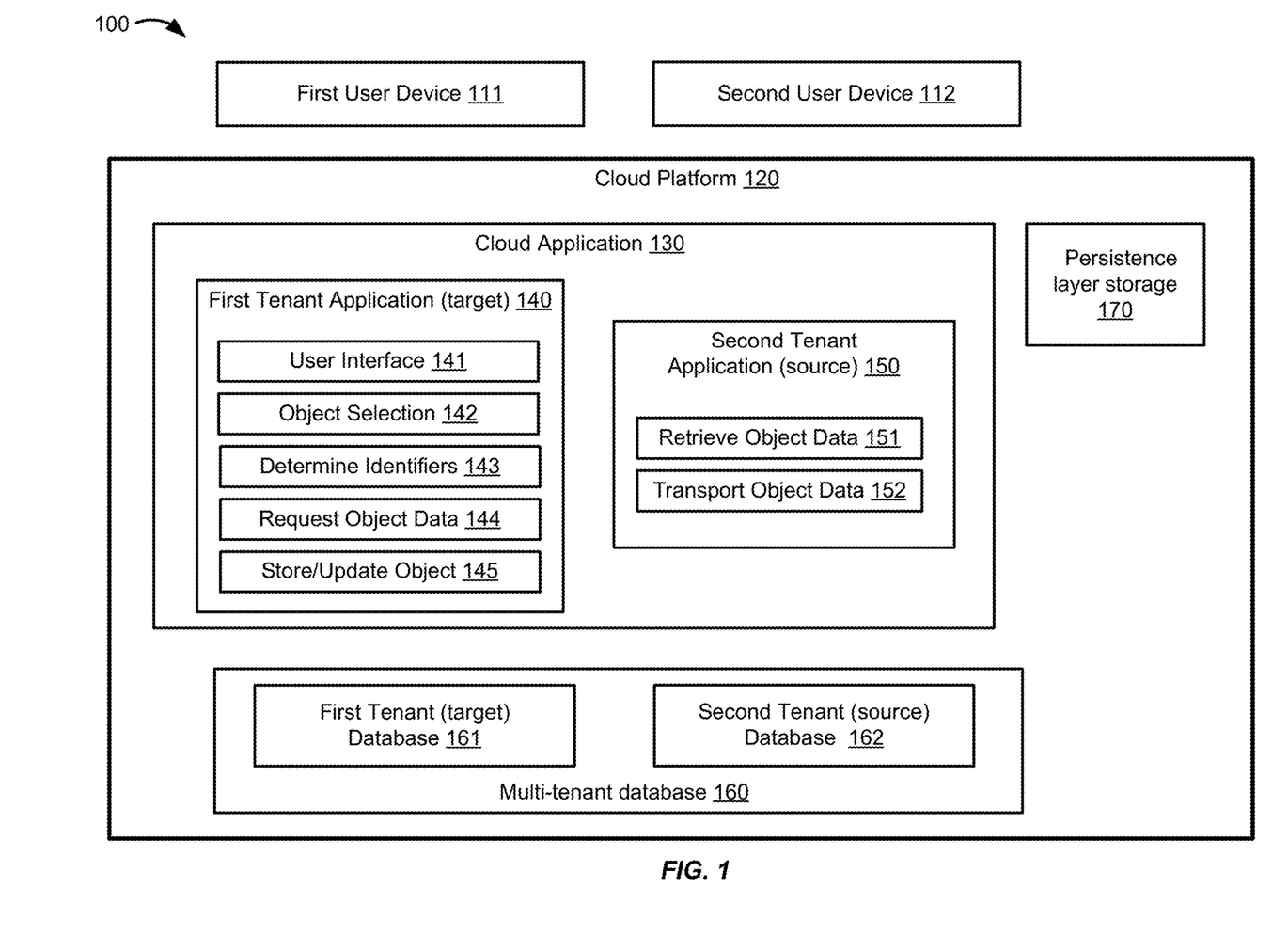
FIG. 1 shows a diagram of a cloud platform providing object-based transportation, according to an embodiment.

FIG. 1 shows a diagram 100 of a cloud platform 120 providing object-based transportation, according to an embodiment. The cloud platform 120 provides a cloud application 130 (e.g., an analytics application) to multiple tenants including a first tenant 140, a second tenant 150, and possibly other tenants (not shown). In this example, a first user device 111 may be used by a user of the first tenant application 140 and the second user device 112 may be used by a user of the second tenant application 150. The cloud platform 120 includes a multi-tenant database 160 including a first tenant database 161 and a second tenant database 162. The term "multi-tenant" refers to a software architecture in which physical resources (e.g., computer machines, processing units, memory, etc.) are shared among a plurality of "tenants," which refers to different groups of users having different access to data and information (e.g., users within a tenant access their own application and data and may not access an application or data of another tenant).

The cloud application 130 may allow for object-based transportation between tenants. In this example the first tenant 140 is the "target" to receive the objects from "source" tenant which is the second tenant 150. Prior to any transportation of object data, a user of the second tenant application 150 may select a particular set of one or more objects to be shared. Objects may be listed based on logged-in users access to/authorized objects in source tenant). In some cases the user may obtain a URL that allows these objects to be shared and the URL may be given to a user of the first tenant application 140. In some cases the share link is not created but instead the first tenant user enters a fully qualified domain name of the second tenant and may perform a login to be able to access authorized objects.

In this embodiment, the user of the first user device 111 may initiate object-based transportation using the first tenant application 140. The first tenant application 140 provides the following software functionality for performing object-based transportation: a user interface component 141, an object selection component 142, a determine identifiers component 143, a request object data component 144, and a store/update object component 145. The second tenant application 150 includes the following software functionality for performing object-based transportation: a retrieve object data component 151 and a transport object data component 152. The first and second tenant application 140, 150 may include other functionality not shown. For instance, in some cases the second tenant may operate as a target instead of a source and in some cases the first tenant may operate as a source instead of a target.

The user interface component 141 may provide the first user device 111 with a user interface for object-based transportation. In some cases the user may select between object-based transportation and package-based transportation (further described below). For instance, the user interface component 141 may obtain a selection via the user interface to use object-based transportation instead of persistence layer-based transportation (e.g., package-based transportation).

The user interface may include a list of a plurality of objects shared by a source tenant 150. The user interface may be a web page accessible by a web browser, for example. Each of the plurality of objects in the list may be associated with an object identifier identifying the particular object. The objects may include an analytics dashboard object, a model object, a dimension object, a role object, a folder object, or any other data object used by the cloud application 130.

In some embodiments the user may provide a source URL. For instance, the user interface component 141 may obtain a source uniform resource locator input via the user interface and the source URL may be used to access the list. In some embodiments, the request sent to the source content management service for each object in the selected set of objects uses the source uniform resource locator.

The object selection component 142 may be configured to obtain a selection from the target tenant application of a set of objects from the plurality of objects. The selection may be obtained based on which objects the user has clicked or selected from the list in the user interface.

The determine identifiers component 143 determines objects identifiers for each of the selected set of objects. The selected objects will each be requested from the source tenant application 150.

For each object in the selected set of objects, the request object data component 144 sends a request to the source tenant 150 (e.g., to a source content management service of the source tenant). The request may include the corresponding object identifier for that object.

The retrieve object data component 151 of the second tenant application 150 may receive this request and access the second tenant database 162 to retrieve the object data. The transport object data component 152 may send the object data back to the first tenant application 140. The request object data component 144 may receive the corresponding object data from the source tenant (e.g., from the source content management service). In this embodiment, the corresponding object data received from the source content management service for each object in the selected set of objects is not retrieved from a persistence layer storage 170 of the source tenant. Instead, the object data is retrieved from the second tenant database 162, which is separate from the persistence layer 170 that may be used by the cloud platform 120 for cloud storage.

The store/update object component 145 may store at least a portion of the corresponding object data in a target tenant database 161. For instance, if the object is not already stored in the first tenant database 161 (which may be determined based on the object identifier), then the storing of at least a portion of the corresponding object data in the target tenant database comprises creating a new object in the target tenant database. If the object already exists in the first tenant database 161 (determined based on the identifier), the storing of at least a portion of the corresponding object data in the target tenant database comprises updating an existing object in the target tenant database having the same object identifier.

One advantage of object-based transportation is that this "pull" process is a single step for the user to perform compared to the three step create package/share package/import package process performed by users on the source tenant and the target tenant described above with respect to persistence layer-based transportation.

Another advantage of object-based transportation is that it may better inform users when they make decisions during object transport as they can preview of objects that don't exist in target tenant preview of objects that exist in target tenant but that do not have an updated version in source tenant or that do have an updated version in the source tenant.

In one example overview of object-based transportation a user can log in to the target tenant and enter a source tenant URL and authorization information. If authorization is success, objects will be listed from source along with its status information as compared to target tenant. Upon selection (and possibly confirmation) by the user, a job is created: send object identifiers, target URL, and source URL to the target content management service. The target content management service starts an object job that iterates each object identifier, gets object details from source tenant via the source content management service, and creates or updates the object in the target tenant. Once all objects are complete, it releases the job and the user can use the objects created in the target tenant.

Figure 2:
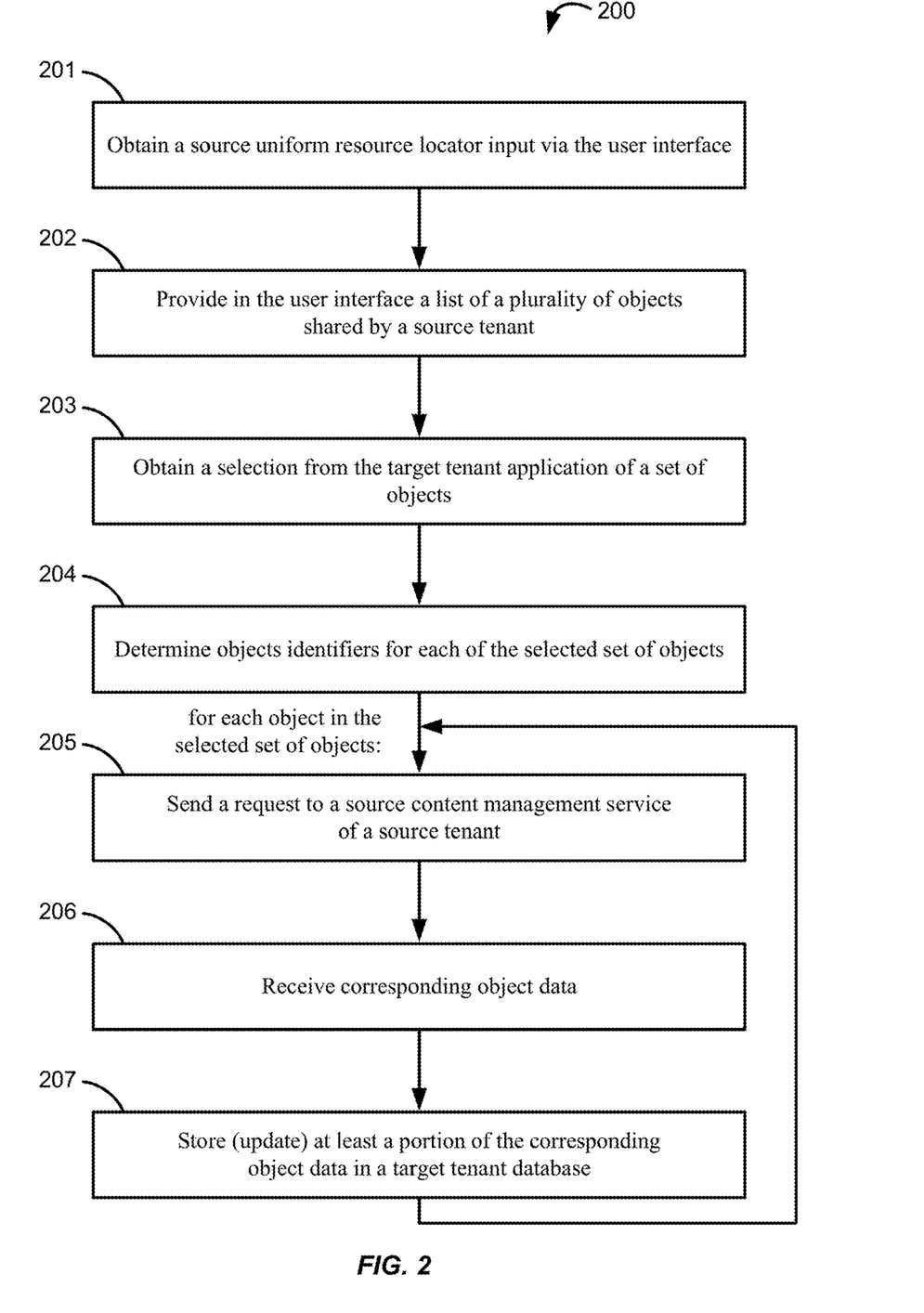
FIG. 2 shows a diagram of a method for object-based transportation, according to an embodiment.

FIG. 2 shows a diagram 200 of a method for object-based transportation, according to an embodiment. The method may be performed by a tenant application such as the target tenant described above with respect to FIG. 1. The method may be performed by executing computer program code comprising instructions. The computer program code may be stored on a non-transitory computer readable medium.

At 201, the method may obtain a source uniform resource locator (URL) input via a user interface of an application of a target tenant.

At 202, the method may provide, in the user interface, a list of a plurality of objects shared by a source tenant. Each of the plurality of objects may be associated with an object identifier.

At 203, the method may obtain a selection from the target tenant application of a set of objects from the plurality of objects.

At 204, the method may determine objects identifiers for each of the selected set of objects.

Then, for each object in the selected set of objects, the method may perform the following:

At 205, the method may send a request to a source content management service of a source tenant. The request may include the corresponding object identifier for that object. The request sent to the source content management service for each object in the selected set of objects may use the source uniform resource locator.

At 206, the method may receive corresponding object data from the source content management service. The corresponding object data received from the source content management service for each object in the selected set of objects may not be retrieved from a persistence layer of the source tenant. The object data may be one an analytics dashboard object, a model object, a dimension object, a role object, or a folder object, for example.

At 207, the method may store at least a portion of the corresponding object data in a target tenant database. In some cases the object data does not previously exist and the storing of at least the portion of the corresponding object data in the target tenant database comprises creating a new object in the target tenant database. In some cases the object data already exists and the storing of at least the portion of the corresponding object data in the target tenant database comprises updating an existing object in the target tenant database having a same object identifier.

Thus, object data may be retrieved from the source tenant based on a user selection without the source object data being stored in a persistence layer of the cloud platform. Instead, the object data is transported from the source tenant database to the target tenant database without using the persistence layer.

Figure 3:
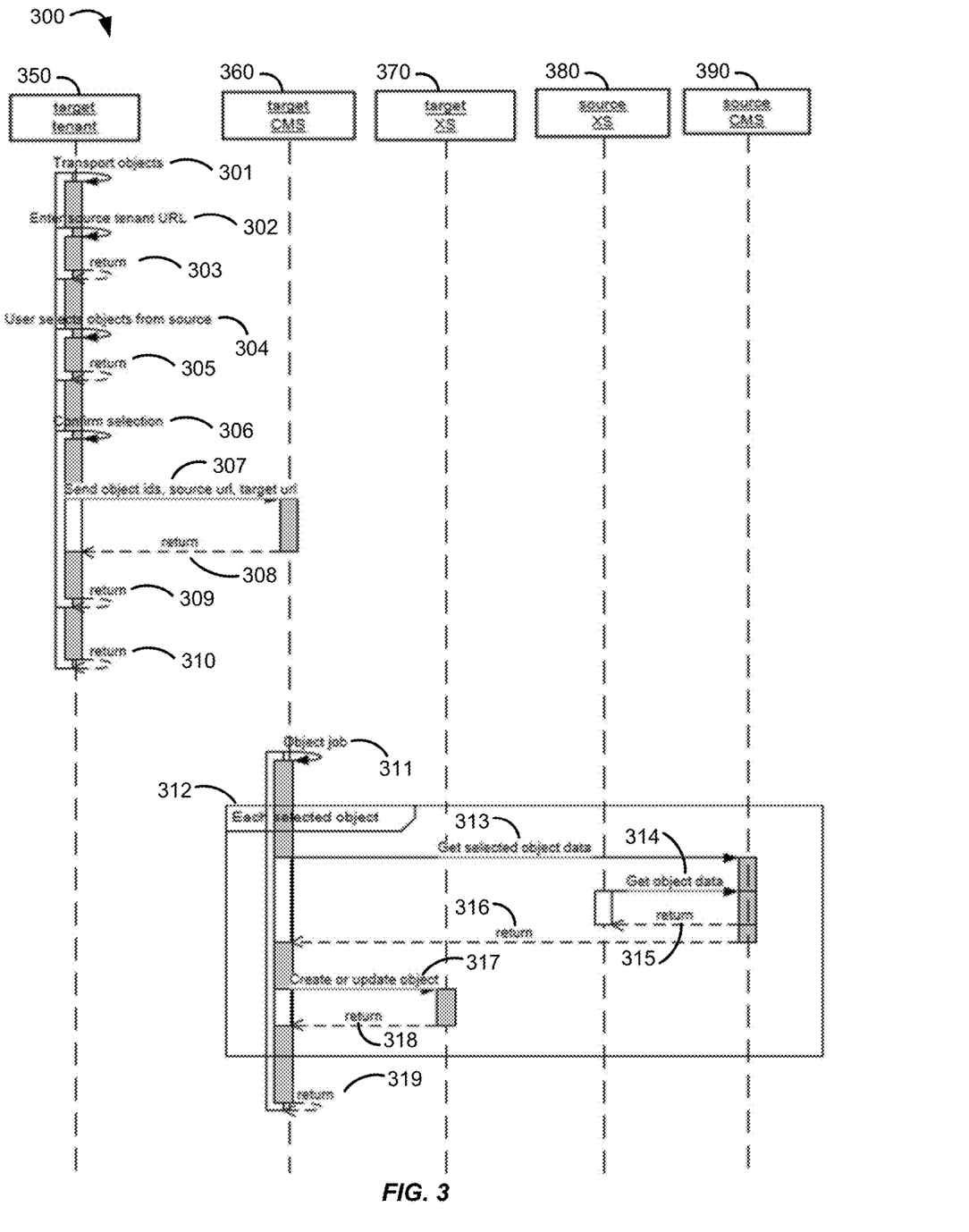
FIG. 3 shows a diagram of object-based transportation from a source to a target, according to an embodiment.

FIG. 3 shows a diagram 300 of object-based transportation from a source to a target, according to an embodiment. The object-based transportation involves transporting objects to a target tenant 350 from a source content management service (CMS) 390 of a source tenant (not shown). The object-based transportation involves a target content management service 360 of the target tenant 350, a target extended application service 370 ("target XS") of a target tenant database (not shown), and a source extended application service 380 ("source XS") of a source tenant database (not shown) that stored the objects to be transported to the target.

At 301, the target tenant 350 initiates the transport objects process. For example, a user of a cloud application on the target tenant initiates the transport object process.

At 302, the target tenant 350 enters a source tenant URL. The source tenant URL may be entered by a user of the cloud application. The source tenant URL may have been provided to the user by a different user of the source tenant for purposes of sharing objects. The source tenant URL may require an authorization or authentication process in order to gain access.

At 303, the target tenant 350 returns the information accessed using the source tenant URL. The information may include a list of objects available for transportations from the source tenant.

At 304, a user of the target tenant 350 selects objects from the source. These objects may be presented in a list based on the information obtained from the source tenant URL.

At 305, the target tenant 350 returns the user's selection of objects. That is, a set of objects from the source tenant selected by the user to be transported to the target tenant.

At 306, the target tenant 350, the user may confirm the selection of objects.

At 307, the target tenant 350 sends object identifiers, the source URL, and a target URL to the target content management service 360. These details may be used to create an object-job in the target content management system. The job may be put into a queue for execution.

At 308, the target CMS 360, returns an indication of success or failed to the target tenant 350. This indication may be an object-job identifier. At 309, the target tenant 350 returns and at 310, the target tenant 350 returns again, ending the flow.

At 311, the target content management service 360 begins an object job. The object job performs a set 312 of steps for each selected object including steps 313-318.

At 313, the target content management service 360 sends a request to the source content management service 390 to get the selected object data. That is, a request to get one of the selected objects.

At 314, the source content management service 390 receives the object data from the source XS 380.

At 315, the source content management service 390 sends a return to the source XS 380. The source CMS 390 may receive object data information from the source XS 380.

At 316, the source content management service 390 sends a return to the target content management service 360. The object data received may be forwarded to the target content management service 360.

At 317, the target content management service 360 sends the received object data to the target XS 370 to create or update an object in the database.

At 318, the target XS 370 returns an indication of success or failure.

At 319, the target content management service 360 returns an indication of success or failure.

Accordingly, the object-based transportation technique allows the user to select a particular set of objects to be transported from the source tenant to the target tenant without using a persistence layer of a cloud platform, instead transporting the object directly from the source tenant database to the target tenant database.

Figure 4:
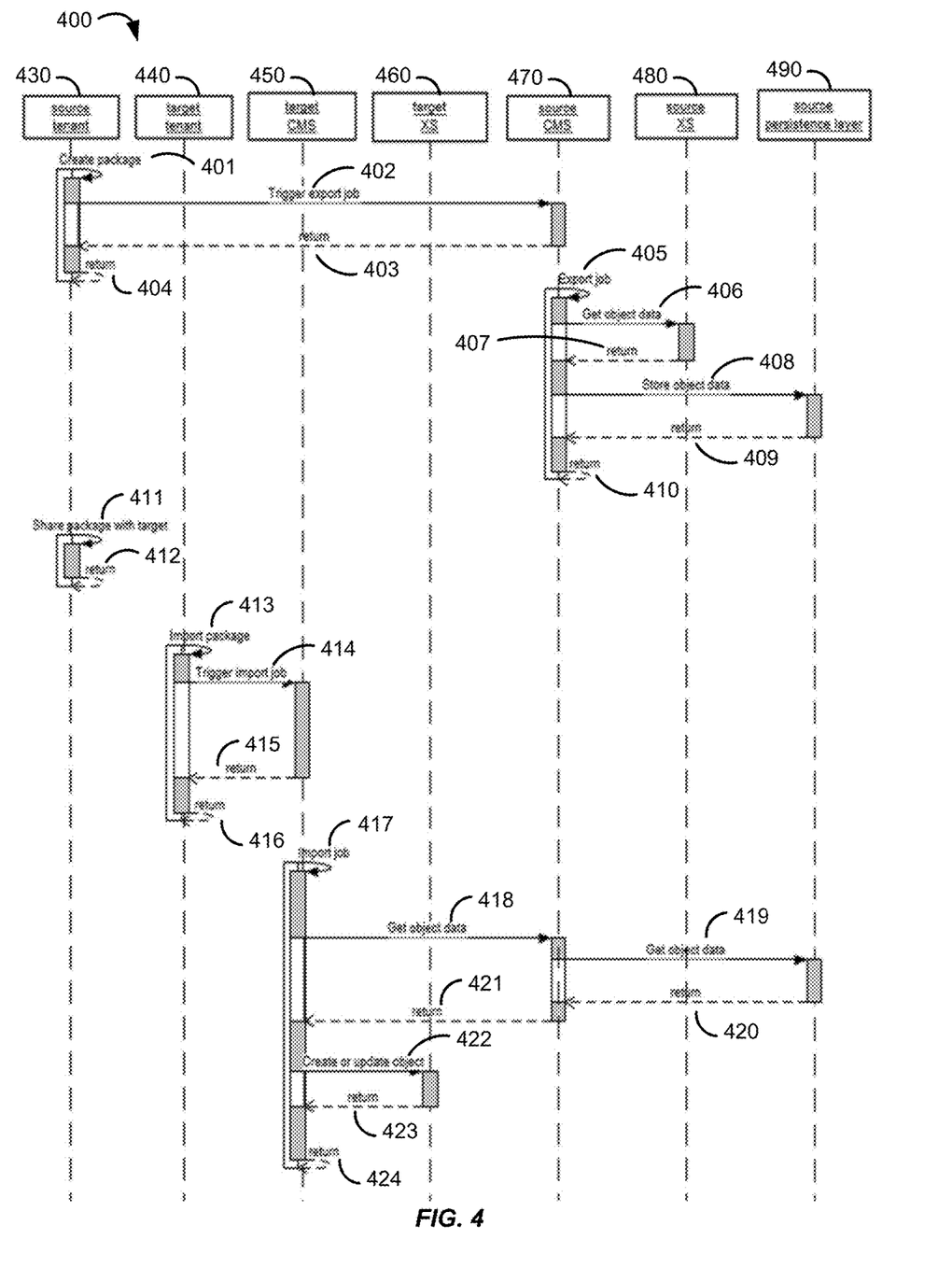
FIG. 4 shows a diagram of package-based transportation from a source to a target, according to an embodiment.

The cloud platform may also enable the user to select between object-based transportation without using the persistence layer as discussed above and package-based transportation using the persistence layer. FIG. 4 shows a diagram 400 of package-based transportation from a source to a target, according to an embodiment. The package-based transportation involves a source tenant 430, a target tenant 440, a target content management service (CMS) 450, a target extended application service 460 ("target XS") of a target tenant database (not shown), a source content management service (CMS) 470, a source extended application server 480 ("source XS"), and a source persistence layer 490.

At 401, the source tenant 430 creates a package. The package includes one or more objects (e.g., dashboard/story, data model, dimension, roles, folder, etc.).

At 402, the source tenant 430 triggers an export job to the source CMS 470.

At 403, returns an indication of success or failure.

At 404, returns an indication of success or failure.

At 405, the source CMS 470 starts the export job to retrieve the objects from the source tenant database.

At 406, the source CMS 470 sends a request to the source XS 480 of the source tenant database to get object data.

At 407, the source XS 480 returns the object data.

At 408, the source CMS 470 sends a request including the object data to the source persistence layer 490 to store the object data.

At 409, returns an indication of success or failure.

At 410, returns an indication of success or failure.

At 411, the source tenant 430 shares the package with the target.

At 412, returns an indication of success or failure.

At 413, the target tenant 440 initiates an import package process.

At 414, the target tenant 440 triggers an import job to the target CMS 450.

At 415, returns an indication of success or failure.

At 416, returns an indication of success or failure.

At 417, the target CMS 450 initiates the import job.

At 418, the target CMS 450 sends a request to the source CMS 470 to get object data.

At 419, the source CMS 470 sends a request to the source persistence layer 490 to get the object data.

At 420, the source persistence layer 490 returns the object data to the source CMS 470.

At 421, the source CMS 470 returns the object data to the target CMS 450.

At 422, the target CMS 450 sends a request to the target XS 460 of the target tenant database to create or update the object.

At 423, returns an indication of success or failure.

At 424, returns an indication of success or failure.

Thus, the user is given the option to perform object-based transportation which avoids or mitigates some of the drawbacks of persistence layer-based transportations or to use persistence-layer-based transportation such as the package-based transportation shown in FIG. 4. The user may choose to use package based transportation when sharing between multiple tenants, for backup/restore functionality, or when sharing standard content like templates or demonstration packages. The user may choose object based transportation instead when privately sharing packages between trusted tenants (e.g., tenants of the same organization). Object-based sharing may also be useful for users that frequently share between tenants. Object-based sharing also helps mitigate the storage limitations of the persistence layer because it does not use it, leaving more persistence layer storage space for sharing that uses it.

Example Hardware

Figure 5:
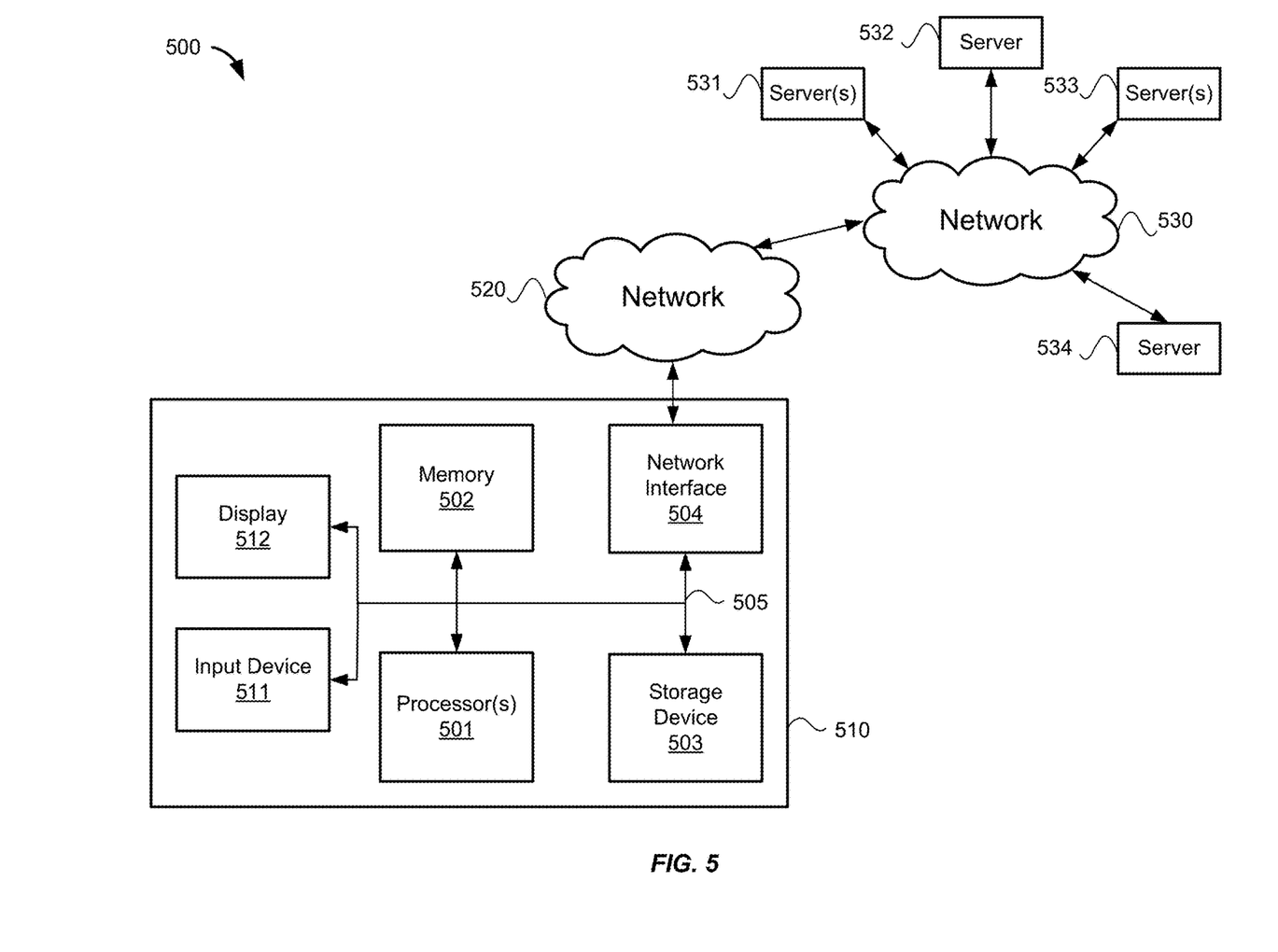
FIG. 5 shows a diagram of hardware of a special purpose computing machine for implementing systems and methods described herein.

FIG. 5 shows a diagram 500 of hardware of a special purpose computing machine for implementing systems and methods described herein. The following hardware description is merely one example. It is to be understood that a variety of computers topologies may be used to implement the above described techniques. The hardware shown in FIG. 5 may be used to implement the computer systems and computer software (computer reprogram code) described herein.

The computer system 510 includes a bus 505 or other communication mechanism for communicating information, and one or more processor(s) 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 510 and a network 520. The network interface 504 may be a wireless or wired connection, for example. The network 520 may be a local area network or an intranet, for example. The computer system 510 can send and receive information through the network interface 504, across the network 520, to computer systems connected to the Internet 530. Using the Internet 530 the computer system 510 may access data and features that reside on multiple different hardware servers 531-534. The servers 531-534 may be part of a cloud computing environment in some embodiments.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
   one or more processors;
   one or more machine-readable medium coupled to the one or more processors and storing computer program code comprising sets instructions executable by the one or more processors to:
   provide a user interface to an application of a target tenant, the user interface including a list of a plurality of objects shared by a source tenant, each of the plurality of objects associated with an object identifier;
   obtain a selection from the target tenant application of a set of objects from the plurality of objects;
   determine objects identifiers for each of the selected set of objects; and
   for each object in the selected set of objects,
   send a request to a source content management service of the source tenant, the request including the corresponding object identifier for that object,
   receive corresponding object data from the source content management service, and
   store at least a portion of the corresponding object data in a target tenant database.

2. The computer system of claim 1, wherein the computer program code further comprises sets instructions executable by the one or more processors to:
   obtain a source uniform resource locator input via the user interface, wherein the request sent to the source content management service for each object in the selected set of objects uses the source uniform resource locator.

3. The computer system of claim 1, wherein the computer program code further comprises sets instructions executable by the one or more processors to:
   obtain a selection via the user interface to use object-based transportation instead of persistence layer-based transportation.

4. The computer system of claim 1, wherein the corresponding object data received from the source content management service for each object in the selected set of objects is not retrieved from a persistence layer of the source tenant.

5. The computer system of claim 1, wherein the corresponding object data for each object in the selected set of objects is an analytics dashboard object, a model object, a dimension object, a role object, or a folder object.

6. The computer system of claim 1, wherein the storing of at least the portion of the corresponding object data in the target tenant database comprises creating a new object in the target tenant database.

7. The computer system of claim 1, wherein the storing of at least the portion of the corresponding object data in the target tenant database comprises updating an existing object in the target tenant database having a same object identifier.

8. One or more non-transitory computer-readable medium storing computer program code comprising sets of instructions to:
   provide a user interface to an application of a target tenant, the user interface including a list of a plurality of objects shared by a source tenant, each of the plurality of objects associated with an object identifier;
   obtain a selection from the target tenant application of a set of objects from the plurality of objects;
   determine objects identifiers for each of the selected set of objects; and
   for each object in the selected set of objects,
   send a request to a source content management service of the source tenant, the request including the corresponding object identifier for that object,
   receive corresponding object data from the source content management service, and
   store at least a portion of the corresponding object data in a target tenant database.

9. The non-transitory computer-readable medium of claim 8, wherein the computer program code further comprises sets instructions to:
   obtain a source uniform resource locator input via the user interface, wherein the request sent to the source content management service for each object in the selected set of objects uses the source uniform resource locator.

10. The non-transitory computer-readable medium of claim 8, wherein the computer program code further comprises sets instructions to:

obtain a selection via the user interface to use object-based transportation instead of persistence layer-based transportation.

11. The non-transitory computer-readable medium of claim 8, wherein the corresponding object data received from the source content management service for each object in the selected set of objects is not retrieved from a persistence layer of the source tenant.

12. The non-transitory computer-readable medium of claim 8, wherein the corresponding object data for each object in the selected set of objects is an analytics dashboard object, a model object, a dimension object, a role object, or a folder object.

13. The non-transitory computer-readable medium of claim 8, wherein the storing of at least the portion of the corresponding object data in the target tenant database comprises creating a new object in the target tenant database.

14. The non-transitory computer-readable medium of claim 8, wherein the storing of at least the portion of the corresponding object data in the target tenant database comprises updating an existing object in the target tenant database having a same object identifier.

15. A computer-implemented method, comprising:
providing a user interface to an application of a target tenant, the user interface including a list of a plurality of objects shared by a source tenant, each of the plurality of objects associated with an object identifier;
obtaining a selection from the target tenant application of a set of objects from the plurality of objects;
determining objects identifiers for each of the selected set of objects; and
for each object in the selected set of objects,
sending a request to a source content management service of the source tenant, the request including the corresponding object identifier for that object,
receiving corresponding object data from the source content management service, and
storing at least a portion of the corresponding object data in a target tenant database.

16. The computer-implemented method of claim 15, further comprising:
obtaining a source uniform resource locator input via the user interface, wherein the request sent to the source content management service for each object in the selected set of objects uses the source uniform resource locator.

17. The computer-implemented method of claim 15, further comprising:
obtaining a selection via the user interface to use object-based transportation instead of persistence layer-based transportation.

18. The computer-implemented method of claim 15, wherein the corresponding object data received from the source content management service for each object in the selected set of objects is not retrieved from a persistence layer of the source tenant.

19. The computer-implemented method of claim 15, wherein the corresponding object data for each object in the selected set of objects is an analytics dashboard object, a model object, a dimension object, a role object, or a folder object.

20. The computer-implemented method of claim 15, wherein the storing of at least the portion of the corresponding object data in the target tenant database comprises creating a new object in the target tenant database or updating an existing object in the target tenant database having a same object identifier.

* * * * *